J. N. JACOBSON.
PLIERS.
APPLICATION FILED APR. 13, 1921.
1,435,131.
Patented Nov. 7, 1922.
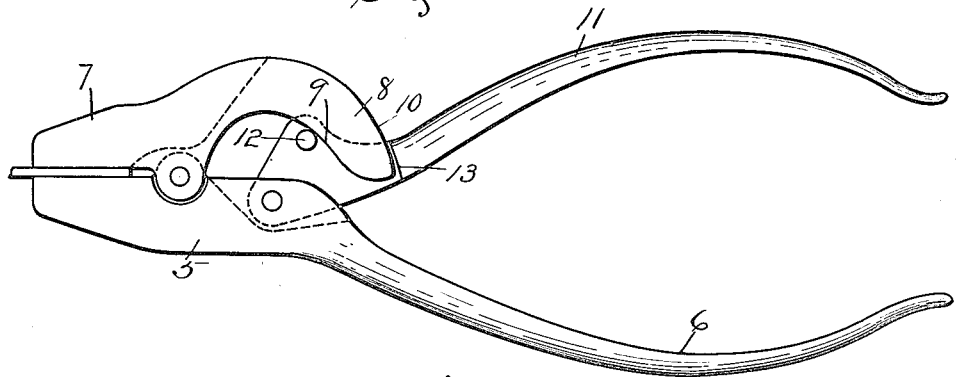
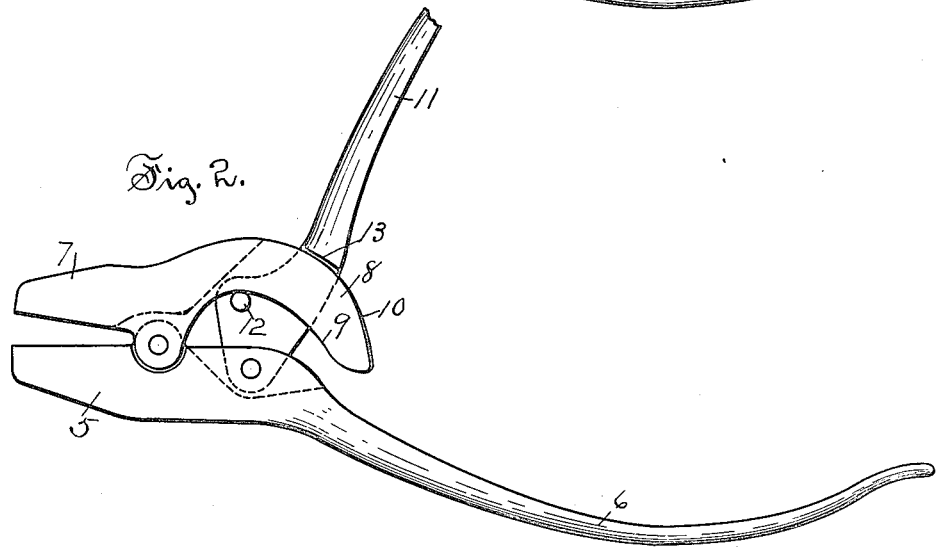
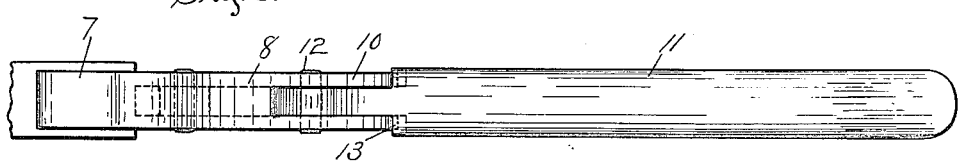
INVENTOR.
John N. Jacobson.
BY
Arthur B. Jenkins.
ATTORNEY.

Patented Nov. 7, 1922.

1,435,131

UNITED STATES PATENT OFFICE.

JOHN N. JACOBSON, OF MANSFIELD CENTER, CONNECTICUT.

PLIERS.

Application filed April 13, 1921. Serial No. 461,041.

*To all whom it may concern:*

Be it known that I, JOHN N. JACOBSON, a citizen of the United States, and a resident of Mansfield Center, in the county of Tolland and State of Connecticut, have invented new and Improved Pliers, of which the following is a specification.

My invention relates to the class of devices above named, and an object of my invention, among others, is to provide a device of this class by means of which the act of closing the jaws together will automatically lock them in a closed position; and a further object of the invention is to provide a device of this class that shall have, with a small expenditure of power at the handle, great power to grip an article between the jaws.

One form of device embodying my invention and in the construction and use of which the objects herein set out, as well as others, may be attained, is illustrated in the accompanying drawings, in which—

Figure 1 is a view in side elevation of a set of pliers embodying my invention, the jaws being closed.

Figure 2 is a similar view showing the jaws in their opened position.

Figure 3 is a view looking downwardly upon the device as shown in Figure 1.

While I have illustrated and described my invention herein in connection with a set of pliers it will be understood that the invention is capable of embodiment in any device comprising jaws and handles for operating such jaws.

In the accompanying drawings the numeral 5 indicates a fixed jaw member constructed of any suitable material and of any desired shape and having a handle 6 integrally formed therewith. A movable jaw member 7, pivotally secured to the jaw 5, has a jaw similar in shape to that of the jaw 5, and, in addition thereto, it is provided with a cam arm 8 having a closing cam surface 9 formed on its inner edge and an opening cam surface 10 formed on its outer edge.

An actuating handle 11 is pivotally secured to the handle member 6, it being here noted that the pivoted jaw and handle members may be secured to the opposite member in any suitable manner. While in the structure illustrated in the drawings one of the members is formed to extend into a groove or slot in the opposite member, such members may be "halved" together in a manner common to devices of this class or they may be connected in any other suitable manner.

The actuating handle 11 is provided with an actuating stud 12 mounted to wipe along the cam surface 9 on the arm 8, the arc on which said stud moves and the cam surface 9 being so relatively arranged with a small angle of divergence that the parts will remain in any position in which they may be placed, that is, this angle of divergence will be so small that any force applied to the jaws, as by an article gripped between them, will be insufficient to cause the stud 12 to move along the cam surface 9. This arrangement also causes any power exerted to close the handle members 6 and 11 together to be greatly multiplied so that it will require but little power thus exerted to securely hold an article between the jaws, and such article will be so securely held whenever the handle members are placed in a closed position and without power being applied thereto.

The opening cam surface 10 on the arm 8 is arranged to make contact with an opening shoulder 13 on the actuating handle 11, this opening cam surface being so positioned and formed that when the handle 11 is moved away from the handle 6 the arm 8 will be moved toward the fixed jaw member thereby causing the jaws to open, the closing and opening cam surfaces and the stud and shoulder being so located as not to cramp the parts during such opening and closing movement.

In accordance with the provisions of the statutes I have described the principles of operation of my invention, together with the device which I now consider to represent the best embodiment thereof; but I desire to have it understood that the device shown is only illustrative, and that the invention may be carried out by other means.

I claim—

1. A fixed jaw and handle, a jaw pivotally mounted on the fixed jaw, a pivotally mounted handle, and actuating means between the pivoted jaw and pivoted handle arranged to hold the pivoted jaw and handle in any position to which they may be moved by power applied to said handle and thereby resist power applied to the jaws to open them and consequently prevent opening movement of said jaws by power thus applied.

2. A fixed jaw and handle, a jaw pivotally mounted on the fixed jaw, a pivotally mounted handle, and interengaging parts upon the pivoted jaw and handle having a cam action one upon the other and arranged to hold said pivoted jaw and handle against relative movement by reason of power applied between the jaws to separate them.

3. A fixed jaw and handle, a jaw pivotally mounted on the fixed jaw and having a cam arm, a pivotally mounted actuating handle having a stud, the arc of movement of said stud and the engaging surface of the arm being located at such angle of divergence as to prevent relative movement by reason of power exerted at the jaws to separate them.

4. A fixed jaw and handle, a jaw pivotally mounted on the fixed jaw, a pivotally mounted handle, a cam arm extending from the pivoted jaw, a stud extending from the pivoted handle to engage the cam on said arm, said stud and cam being arranged with the arc of movement of the stud and the cam at such divergence as to prevent relative movement by reason of force applied to said jaws.

5. A fixed jaw and handle, a jaw pivotally mounted on the fixed jaw, a pivotally mounted handle, cam engaging means between the pivoted jaw and handle arranged to automatically hold the jaw in any position in which it may be held, and resist opening movement of the jaws by power applied to them, and cam engaging means to cause opening movement of the jaws.

JOHN N. JACOBSON.